United States Patent [19]

Porter et al.

[11] Patent Number: 5,305,970
[45] Date of Patent: Apr. 26, 1994

[54] CENTRIFUGAL SPACE PROPELLANT STORAGE AND TRANSFER DEPOT

[75] Inventors: John W. Porter, San Diego; William A. Johns, Poway; David A. Caudle, San Diego, all of Calif.

[73] Assignee: General Dynamics Corporation, Space Systems Division, San Diego, Calif.

[21] Appl. No.: 3,163

[22] Filed: Jan. 12, 1993

[51] Int. Cl.$^5$ .......................... B64G 1/00; B64G 1/64
[52] U.S. Cl. ............................. 244/159; 244/135 R; 244/161
[58] Field of Search ................... 244/158 R, 158, 161, 244/172, 135 R, 135 A

[56] References Cited

U.S. PATENT DOCUMENTS

| | | | |
|---|---|---|---|
| 3,300,162 | 1/1967 | Maynard et al. | 244/159 |
| 3,478,986 | 11/1969 | Fogarty | 244/159 |
| 3,744,739 | 7/1973 | Weaver et al. | 244/161 |
| 4,408,943 | 10/1983 | McTamuney et al. | 244/161 |
| 4,735,382 | 4/1988 | Pinson | 244/159 |
| 4,858,857 | 8/1989 | Lange et al. | 244/161 |

FOREIGN PATENT DOCUMENTS 0038500 2/1991 Japan ............................ 244/159

*Primary Examiner*—Galen L. Barefoot
*Attorney, Agent, or Firm*—John R. Duncan, Jr.; Frank D. Gilliam

[57] ABSTRACT

A centrifugal propellant depot positioned in outer space for storing and transferring cryogenic liquid propellants to and from transfer space vehicles which are adapted to transport cryogenic liquid propellants to the depot to receive the liquid propellants stored in the depot. The depot includes a plurality of contra-rotatable torus-shaped hollow storage tanks adapted to receive cryogenic liquid oxygen and hydrogen propellants that are carried in gas/liquid phase separation by rotational gravity. Transport rail members transversely bridge the storage tanks. A central docking hub is coupled to the transport rail members and disposed centrally of the rotating storage tanks. The docking hub may receive a transfer space vehicle on either of two opposing sides of the hub for transfer, via a transfer vehicle coupled to the rail members, outwardly to the storage tanks. The space vehicle may be flipped from an inwardly reclining position for draining of the liquid propellant into a storage tank outwardly to a position for receiving liquid propellant from a storage tank. A radially movable counterweight is also coupled to the rail members for movement as the space vehicle is carried by the transfer vehicle and transfer of liquid propellant is accomplished to ensure that the center of gravity of the depot is maintained at the central docking hub for gyroscopic stability. The counterweight includes an encapsulated hydrogen absorber, such as Lanthanum-Nickel 5 to sore waste hydrogen for further use. The rotating storage tanks of the depot are provided with variable interior baffles to ensure that the liquid propellant contained therein rotates at the same rotational speed as the storage tanks. Solar panels are attached to the depot to provide electricity.

22 Claims, 3 Drawing Sheets

CENTRIFUGAL SPACE PROPELLANT STORAGE AND TRANSFER DEPOT

TECHNICAL FIELD OF THE INVENTION

The present invention relates to an improvement in the field of fueling space vehicles which includes all types of in space vehicles including artificial satellites and more particularly, but not by way of limitation, to centrifugal propellant depot for storing and transferring cryogenic or non-cryogenic liquid propellants to space vehicles in space.

DESCRIPTION OF THE BACKGROUND ART

A national Space Exploration Initiative (SEI) program is presently being contemplated by NASA and is expected to be pursued. A study of SEI requirements has placed cryogenic in-space transfer technology high on its list of technology evolution priorities. Reusable chemical and nuclear space transportation vehicles (STV's) will use cryogenic liquid Hydrogen (LH2) and liquid Oxygen (LOX) propellants. Contemplated space depot concepts for servicing these vehicles use large mechanical pumps, special zero-gravity mass gauges, and require both depot and vehicle tanks to be constructed with several internal hoop-like capillary acquisition channels. The transfer process using this approach is necessarily slow by Earth standards. Time must be taken to ensure that liquid cohesion to acquisition channels is not broken. If there is gas in the transferring liquid (mixed phase), this can also halt the flow process, and/or cause false fill level readings. While ground launch facilities can fill and drain 20,400 kg. (45,00 lbs) of cryogens from today's Centaur space vehicle in times on the order of ½ to 1½ hours, it could take two to three days for the capillary process. Further, this technology has not been proven in a zero gravity environment. Expensive experimentation to demonstrate and quantify its processes remains to be conducted. Because of this perceived development burden, the role of space propellant transfer and top off has been moved well into the future in current estimates.

Although many arrangements that have been proposed for such purposes are noteworthy to one extent or another, none appear to achieve the objectives of an efficient, reliable, practical, reasonably priced large cryogenic propellant depot for fueling and draining reusable STV's before and after missions.

None of the previously proposed arrangements provide the benefits attendant with the present invention. The present invention achieves its intended purposes, objects and advantages over the previous proposal through a new, useful and unobvious combination of component elements, with the use of a minimum number of functioning parts, at a reasonable cost to manufacture, and by employing only readily available materials.

It is a general object of this invention to provide a large propellant depot for fueling and draining STV's before and after missions and/or refueling artificial satellites to extend their useful life.

It is a further general object of the invention to provide a centrifugal propellant depot that works by a natural principle, requires no pumps for propellant transfer, and which will have no breakdowns due to pump or sensing equipment malfunction.

It is a specific object of this invention to provide a centrifugal pumping propellant depot that is efficient to operate, transfers propellant at an optimum rate, and is less expensive in both initial and life cycle costs than presently contemplated arrangements.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiments shown in the attached drawings. For the purpose of summarizing the invention, the invention may be briefly stated as contemplating a centrifugal propellant depot positioned in outer space for storing and transferring cryogenic liquid propellants, such as liquid oxygen and liquid hydrogen.

The depot preferably includes a pair of stacked contra-rotating torus shaped hollow storage tanks adapted to receive liquid propellants.

Docking assist arms are provided on each side of the docking hub to assist in receiving and securing a docking space vehicle and to transport it radially outwardly on the rail members to a propellant transfer position. If propellant is to be transferred from the space vehicle to a depot storage tank, the space vehicle is reclined inwardly of the depot storage tank and within the plane thereof for transfer by rotational gravity of the liquid propellant from the vehicle tanks by connections to the storage tank. If the propellant is to fill the space vehicle from a depot storage tank, the vehicle is flipped outwardly and into the plane of the tank for connection therewith and transfer again by rotational gravity of the liquid propellants into the connected space vehicle.

As the space vehicle is carried outwardly by a docking cage and a transfer of liquid propellant is made therebetween, a counterbalance mass means moves radially and oppositely on the rail members to act as a counterweight to the docking cage and associated space vehicle to ensure that the center of gravity of the depot remains at the depot center of mass, and to ensure gyroscopic stability. When liquid hydrogen is stored, the counterbalance mass means includes an encapsulated hydrogen absorber, such as Lanthanum-Nickel 5, to absorb waste hydrogen for further use by the depot.

It will be understood that while each central hub means will be rotating with one of the toroidal tanks, a suitable clutch system is provided for disengaging the top portion of the central hub (the docking cage) and a transfer vehicle for receiving an incoming space vehicle for clocking connection.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION OF THE DRAWINGS

Figure 1:
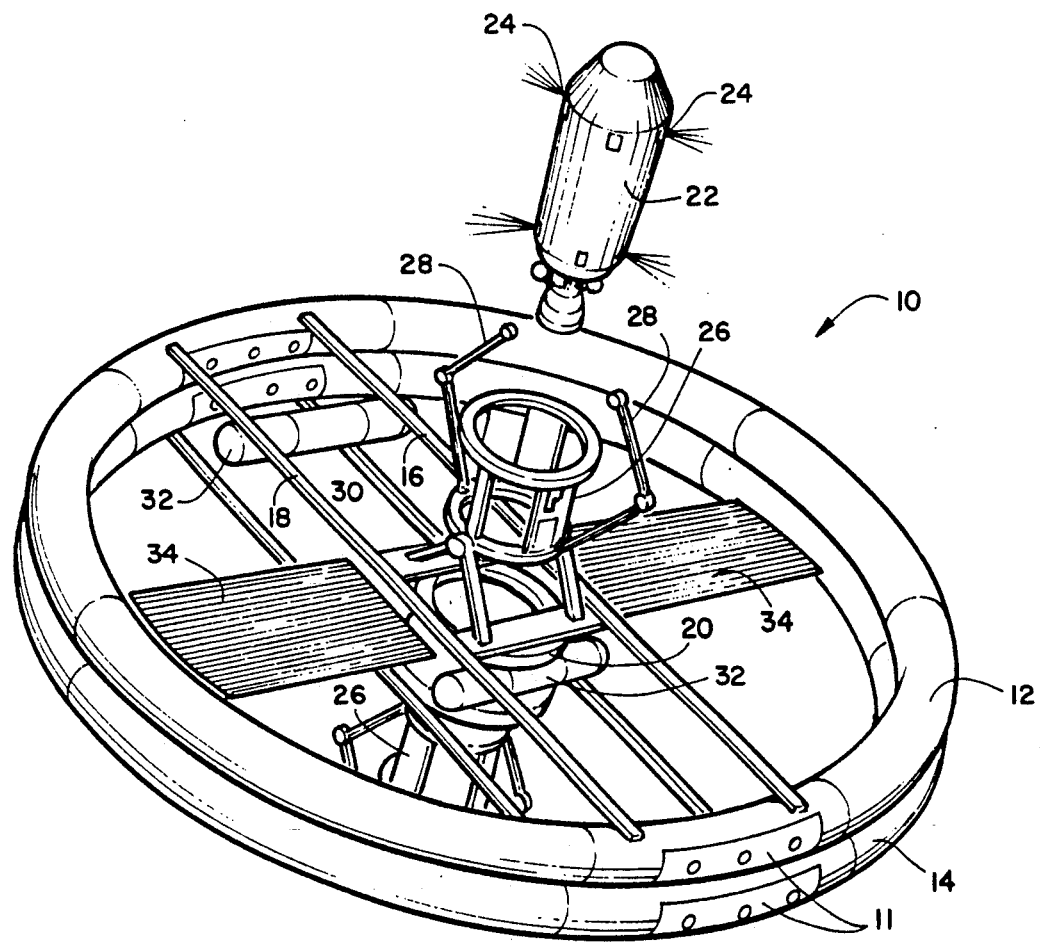
FIG. 1 is a simplified perspective of a centrifugal propellant depot constructed in accordance with a preferred embodiment of the invention prepared to dock a transfer space vehicle.

Referring now to the drawings in detail, and in particular to FIG. 1, reference character 10 generally designates a centrifugal pumping propellant depot constructed in accordance with a preferred embodiment of the present invention. The depot 10 includes a plurality of contra-rotating torus-shaped hollow storage tanks 12 and 14 that are adapted to receive and store cryogenic liquid propellants such as liquid hydrogen and liquid oxygen or non-cryogenic propellants as for example and not by way of limitation Hydrazine and Nitrogen Tetroxide. It is anticipated that the main structure of the tanks 12 and 14 would be made of aluminum, stainless steel or any other suitable material and an appropriate layer of radiation shielding and vapor cooled shields for boiloff suppression would be applied to the tanks 12 and 14 for further protection.

The tanks 12 and 14 would both be bridged by spaced transport rail members 16 and 18. A suitable clutch interface 30 is provided between the docking cage 26 and the hub 20 whereby when the tanks 12 and 14 are at a desired rotational speed and a docking maneuver of the space vehicle 22 is to be accomplished. The clutch 30 disengages the docking cage vehicle 26 from rotation with the depot so that it may present a stationary target for an incoming space vehicle 22. Thrusters or gyros or the like may be provided for a docking cage 26 to ensure that it is stationary for a docking procedure.

A suitable combination of counterbalancing masses 32 are also coupled to the transport rail members 16 and 18. These are deployed radially to counterbalance the movement of the docking cage 26 and an associated space vehicle 22 to a transfer position and during transfer of a liquid propellant between the space vehicle 22 and one of the tanks 12 and 14. Thus, it is possible for the depot to maintain a desired gyroscopic stability during transfer operations.

The counterbalancing masses 32 also is important in that they contains a suitable hydrogen absorber, such as Lanthanum-Nickel-5, to absorb boiled off hydrogen and store it for use in station-keeping and for use in rotational control thrusters of the depot 10.

The present invention also contemplates that suitable solar panels 34 could be affixed to a suitable portion of the depot 10 such as the central hub means 20 or the transport rail members 16 and 18 to provide electricity to the depot 10.

Figure 2:
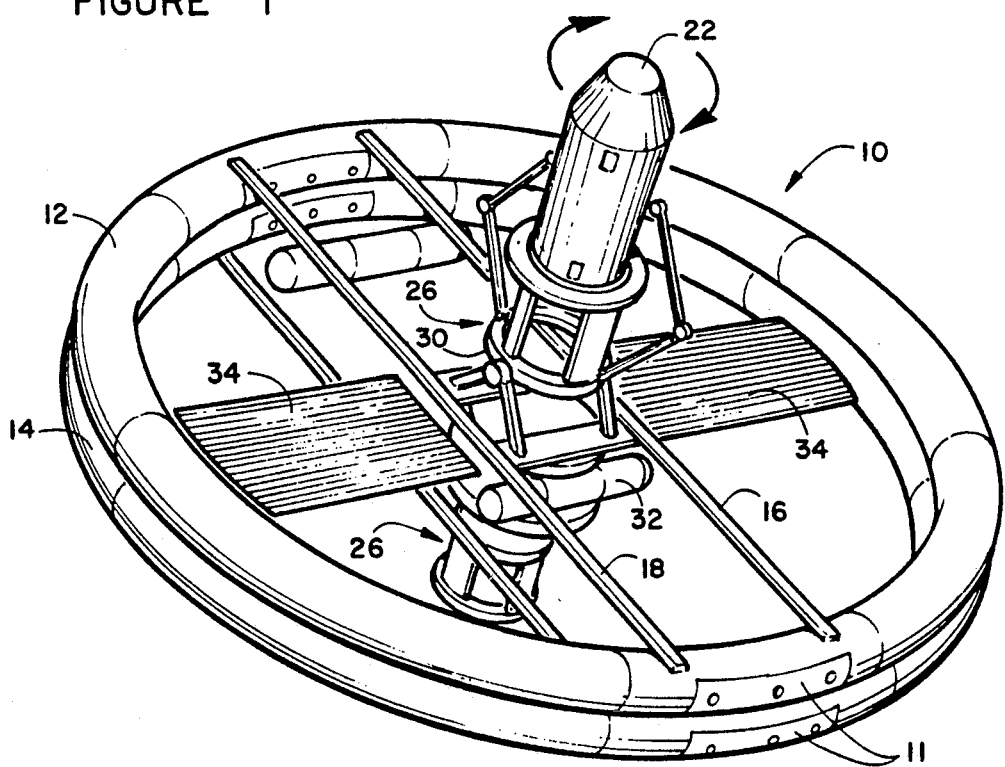
FIG. 2 is a simplified perspective of the depot of FIG. 1 which illustrates the docking of the transfer space vehicle.

Referring now to FIG. 2, it will be seen how a transfer space vehicle 22 docks at the docking cage 26. Docking here preserves balance of the depot 10 and is the easiest docking point. There are no offset rotations to match, and the rotation speed will be least, if not stationary for the vehicle 22. Thus, the docking maneuver for the transfer vehicle 22 is reasonable for the vehicle 22 to match and to settle into locking engagement with docking cage 26. The close up in FIG. 1 shows details of docking cage 26 and its relationship to rails 16 and 18, and docking hub 20.

Figure 3:
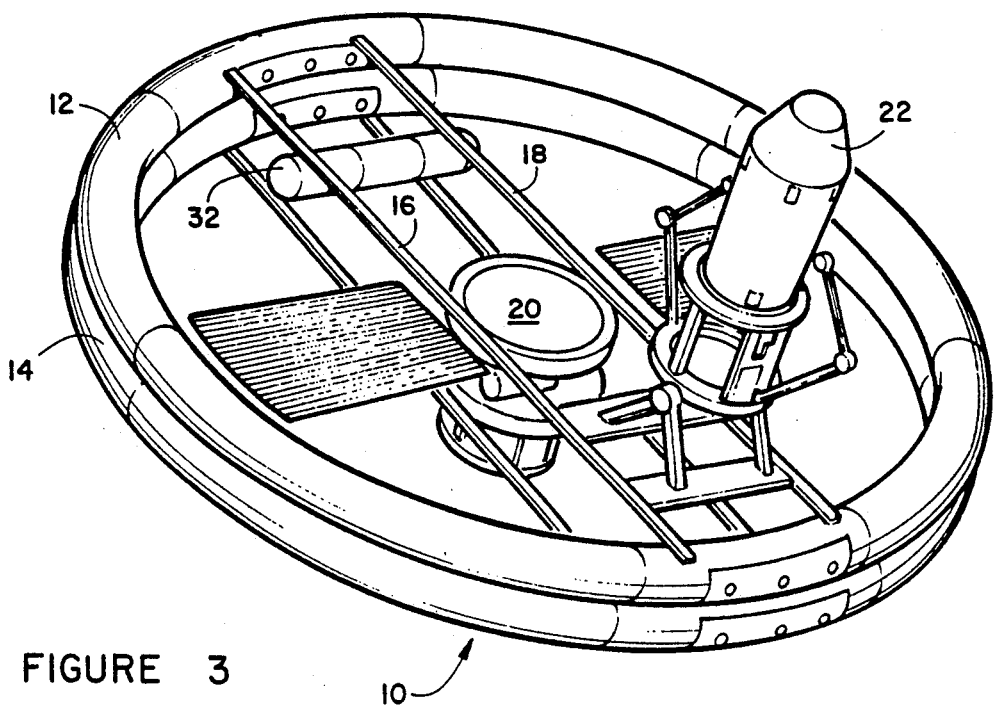
FIG. 3 is a simplified perspective illustrating the movement of the space vehicle to a propellant transfer position.

Referring now to FIG. 3, it will be seen that upon docking of the vehicle 22 into the central docking cage 26 the interface 30 engages and the docking cage 26 and the space vehicle 22 are then moved along the transport track members 16 and 18 to a desired propellant transfer position. As the docking cage 26 and associated secured space vehicle 22 progresses along the track members 16 and 18 the counterweights 32 move in an opposite direction as required to maintain desired balance of the depot 10. For ease of illustration, a top counterweight 32 is shown in its most extended position but it will be understood that the position of counterweights 32 along the rails 16 and 18 will vary according to the position of the vehicle 26 and the space vehicle 22 and according to the state of transfer of the liquid propellant between a tank of the depot 10 and the space vehicle 22.

Figure 4A:
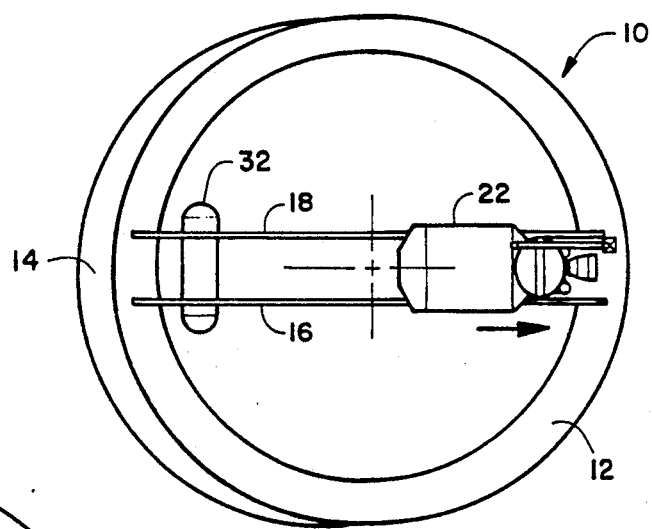
FIGS. 4a and 4b are simplified perspectives illustrating the two propellant transfer positions for a space vehicle in the depot.

In FIG. 4 the depot 10 arrangement has been simplified even further to more clearly illustrate an important feature in the transfer of propellant centrifugally by the depot 10. Referring to the left side of FIG. 4 it will be seen that the space vehicle 22 has been transported by the docking cage 26 to the rim of the depot 10 and has been reclined inwardly to lie within the plane of a tank 12. Suitable connections are made between a propellant tank of the vehicle 22 and the tank 12, as seen in FIGS. 4 and 5 and will be discussed in more detail hereinafter. In the illustrated drain position of FIG. 4a, liquid propellant contained within a tank of the vehicle will be controllably drained into the tank 12 of the depot 10 by the rotational gravity of the rotating depot 10 and coupled space vehicle 22.

Figure 4B:
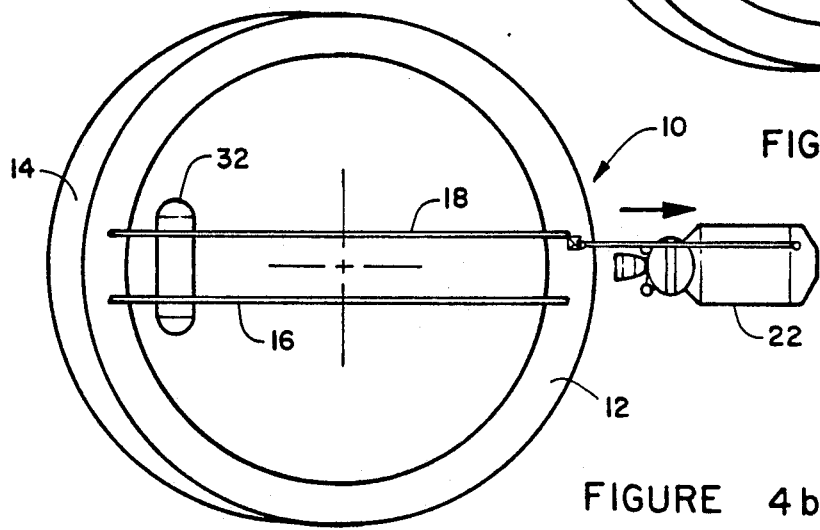
Figure 5:
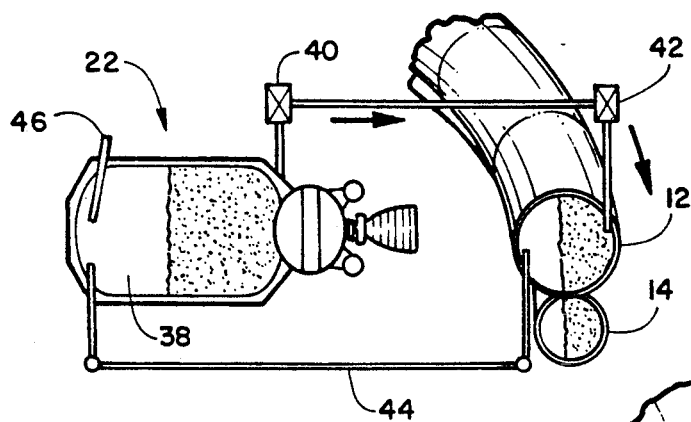
FIG. 5 is a perspective shown partially in section to illustrate a propellant transfer connection between a space vehicle and the depot.

In the fill position of FIG. 4b, the space vehicle 22 is shown as being flipped outwardly into a liquid propellant receiving position. In this position liquid propellant contained within the tank 12 is controllably transferred into a tank within the space vehicle 22.

In FIG. 5, components of the depot 10 have not been illustrated for ease of illustration and understanding. In FIG. 5, the space vehicle 22 will be seen as connected to the tank 12 in a draining connection as was seen in FIG. 4a. it should be noted in FIG. 5, that due to the rotational velocity of the depot 10 there is an automatic gas and liquid separation of the cryogenic propellant so that only the liquid portion is transferred. A suitable fluid connection 36 is made between the outer most portion of the tank 12 and the inner most portion of the tank 38 of the space vehicle 22. Suitable control valves 40 and 42 are interposed in the connection 36 to control communication between the tank 38 of the vehicle 22 and the tank 12 of the depot 10. A suitable over pressure equalization tube 44 connects the inner most portion of the tank 12 to the outermost portion of the tank 38 to preclude over pressurization of the tank 12. A suitable fill tube stub 46 is connected to the tank 38 of the space vehicle 22 for filling of the tank 38 at a remote location.

Figure 6:
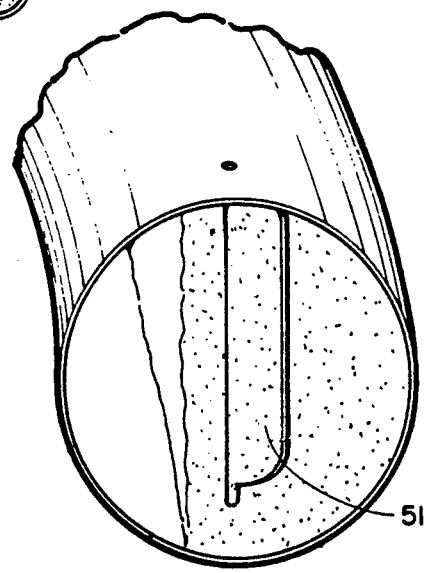
FIG. 6 illustrates one of the several variable pitch baffle that force liquid rotation.

FIG. 6 illustrates an exemplary variable pitch baffle arrangement to ensure that the rotational velocity of the propellant contained in a tank is the same as that of the tank.

Figure 7:
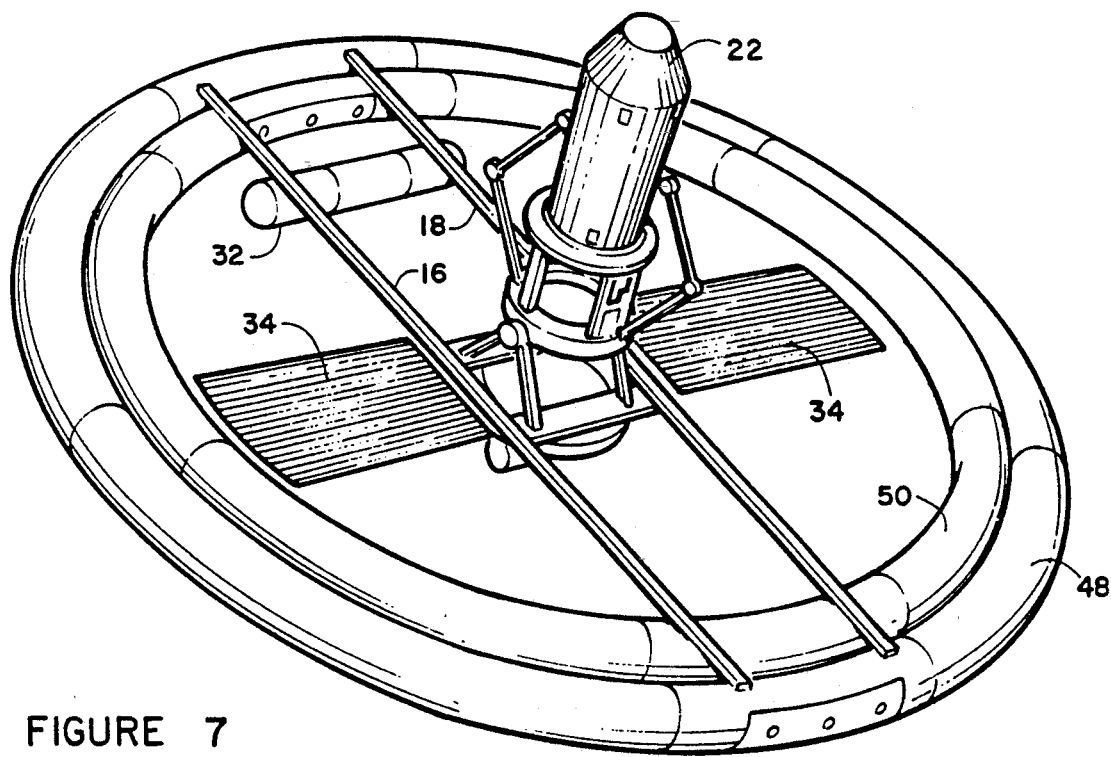
FIG. 7 is a simplified perspective which illustrates a second embodiment of the invention.

In FIG. 7 is seen another embodiment of the present invention in which like numerals designate like parts as in the description of the embodiment shown in FIG. 1. In the embodiment of FIG. 7, the tanks 48 and 50 are arranged concentrically so that the space vehicle 22 in either of the two transfer positions illustrated in FIG. 4a and 4b can communicate with both of the tanks 48 and 50 simultaneously. Also, in the embodiment of FIG. 7 the size of the tanks 48 and 50 may be optimized to store liquid propellant in approximately the same ratios as would be anticipated by the burn ratio of the vehicle 22 or another vehicle to which the vehicle 22 transfers propellants received from the depot 10.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. A centrifugal propellant depot positioned in outer space for storing and transferring liquid propellants to and from transfer space vehicles which are adapted to transport liquid propellants to the depot for storage or to receive the liquid propellants stored in the depot and comprising:

a plurality of contra-rotatable torus-shaped hollow storage tanks adapted to receive liquid oxidizer and fuel propellants:

transport rail means transversely bridging the hollow storage tanks;

central docking hub means coupled to the rail means and adapted to securably receive a space vehicle in the central portion of the transport rail means and to assist in transporting the space vehicle outwardly to a transfer position for establishing communication between the storage tanks and the space vehicle for transfer of said oxidizer and fuel therebetween;

docking cage means operatively coupled to said central docking hub means and to the transport rail means for receiving the space vehicle and to releasably connect the space vehicle when placed in the transfer position to a predetermined storage tank for controllably transferring of said oxidizer and fuel therebetween; and counterbalancing mass means coupled to the transport rail means for variable deployment therealong as required to counterbalance the movement of the transfer vehicle means and the secured space vehicle radially on the transport rail means and the transfer of said oxidizer and fuel between the space vehicle and a storage tank.

2. The centrifugal propellant depot of claim 1 wherein the counterbalancing mass means also includes absorbing means for releasably storing waste hydrogen for further use by the depot.

3. The centrifugal propellant depot of claim 2 wherein the absorbing means contained within the counterbalancing mass means comprises a hydrogen absorber.

4. The centrifugal propellant depot of claim 3 wherein said hydrogen absorber is encapsulated Lanthanum-Nickel 5.

5. The centrifugal propellant depot of claim 2 wherein the liquid propellants are automatically separated into liquid and gas phases by the rotation of the storage tanks.

6. The centrifugal propellant depot of claim 2 wherein the liquid propellent transfer from the depot storage tanks to the space vehicle is accomplished by positioning the space vehicle radially inwardly and within the plane of the torus-shaped storage tanks of the depot.

7. The centrifugal propellant depot of claim 2 wherein propellant transfer from the space vehicle to the depot storage tanks is accomplished by positioning the space vehicle radially outwardly and within the plane of the rotating storage tanks.

8. The centrifugal propellant depot of claim 2 wherein each of the storage tanks of the depot is provided with interior variable baffle means to ensure that the rotational speed of the liquid propellant is substantially the same as that of the containing storage tank.

9. The centrifugal propellant depot of claim 7 wherein the baffle means includes a plurality of spaced variable pitch baffles.

10. The centrifugal propellant depot of claim 2 wherein the docking hub means includes interface clutch means to selectively disengage the docking cage means from rotational engagement therewith.

11. The centrifugal propellant depot of claim 10 wherein the docking cage means further includes thruster means to completely stop rotation of the docking cage means for disengagement from rotational movement with the spinning depot to permit docking of a space vehicle into the docking cage means.

12. The centrifugal propellant depot of claim 10 wherein the docking cage means further includes robotic arm means to assist the space vehicle in docking into the docking cage means.

13. The centrifugal propellant depot of claim 12 which further includes solar panel means coupled to the central docking hub means for generating electricity for use by the depot.

14. The centrifugal propellant depot of claim 2 wherein the counterbalancing mass means is translated radially from the central docking means according to the radial movement of the docking cage and the secured space vehicle from the central docking means and to the transfer of liquid propellant between the space vehicle and the storage tanks to maintain the center of gravity of the depot at the center of the central docking hub means.

15. The centrifugal propellant depot of claim 1 wherein each of the contra-rotating storage tanks have the same radius so as to be vertically stacked.

16. The centrifugal propellant depot of claim 15 wherein the central docking hub means is adapted to receive a space vehicle on opposing sides and the transport rail means provides two opposing transversely bridging paths across the torus-shaped storage tanks and a docking cage means is provided for each transport rail means whereby a space vehicle may be received on each opposing side and transported radially outwardly to a position for transfer of liquid propellant between the space vehicle and a storage tank.

17. A centrifugal propellant depot positioned in outer space for storing and transferring liquid propellants to and from space transfer vehicles which are adapted to transport cryogenic liquid propellants to the depot for storage or to receive the liquid propellants stored in the depot and comprising:

a plurality of concentrically arranged rotating torus-shaped hollow storage tanks adapted to receive cryogenic liquid oxidizer and fuel propellants;

transport rail means transversely bridging the storage tanks;

central docking hub means coupled to the rail means and adapted to securably receive a space vehicle;

docking hub vehicle means operatively coupled to the central docking hub means and to the transport rail means for receiving the space vehicle and to transfer it to a position for transfer of liquid propellant between the space vehicle and a predetermined storage tank; and counterbalancing mass means coupled to the transport rail means for variable deployment therealong as required to counterbalance the movement of the docking cage means and secured space vehicle to a transfer position and resultant transfer of propellant therebetween, the counterbalancing means including hydrogen absorbing means for releasably storing waste hydrogen for further use.

18. The centrifugal propellant depot of claim 17 wherein the counterbalancing mass means also includes absorbing means for releasably storing waste hydrogen for further use by the depot.

19. The centrifugal propellant depot of claim 18 wherein the hydrogen absorbing means comprises Lanthanum-Nickel 5.

20. The centrifugal propellant depot of claim 19 wherein the storage tanks are sized to the burn ratio of the propellants.

21. The centrifugal propellant depot of claim 20 wherein each storage tank is provided with means to ensure the propellant rotates at the same velocity as the containing toroidal tank.

22. The centrifugal propellant depot of claim 21 wherein the means to ensure common rotational velocity of a propellant and an enclosing tank includes a plurality of spaced variable pitch interior baffles.

* * * * *